United States Patent
Joh (10) Patent No.: US 11,195,527 B2
(45) Date of Patent: Dec. 7, 2021

(54) APPARATUS AND METHOD FOR PROCESSING SPEECH RECOGNITION

(71) Applicants: Hyundai Motor Company, Seoul (KR); Kia Motors Corporation, Seoul (KR)

(72) Inventor: Jae Min Joh, Yongin-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 256 days.

(21) Appl. No.: 16/529,628

(22) Filed: Aug. 1, 2019

(65) Prior Publication Data

US 2020/0193986 A1 Jun. 18, 2020

(30) Foreign Application Priority Data

Dec. 12, 2018 (KR) ........................ 10-2018-0159730

(51) Int. Cl.
*G10L 15/22* (2006.01)
*G10L 15/30* (2013.01)
*G06F 3/16* (2006.01)

(52) U.S. Cl.
CPC .............. *G10L 15/22* (2013.01); *G06F 3/167* (2013.01); *G10L 15/30* (2013.01); *G10L 2015/223* (2013.01); *G10L 2015/228* (2013.01)

(58) Field of Classification Search
USPC .................................................. 704/1–504
See application file for complete search history.

(56) References Cited

U.S. PATENT DOCUMENTS

| | | | | |
|---|---|---|---|---|
| 4,811,399 A | * | 3/1989 | Landell | G10L 25/87 704/241 |
| 4,914,704 A | * | 4/1990 | Cole | G06F 3/167 704/235 |
| 5,214,707 A | * | 5/1993 | Fujimoto | B60R 16/0373 381/92 |
| 5,500,920 A | * | 3/1996 | Kupiec | G10L 15/1815 704/270.1 |
| 5,615,296 A | * | 3/1997 | Stanford | G10L 15/22 704/270.1 |
| 5,754,977 A | * | 5/1998 | Gardner | G06K 9/6255 704/231 |
| 5,774,858 A | * | 6/1998 | Taubkin | B60R 25/257 704/270 |
| 5,983,179 A | * | 11/1999 | Gould | G09B 19/04 704/270.1 |

(Continued)

FOREIGN PATENT DOCUMENTS

| | | |
|---|---|---|
| JP | 2000-194394 A | 7/2000 |
| KR | 10-1619260 B1 | 5/2016 |

*Primary Examiner* — Marcus T Riley
(74) *Attorney, Agent, or Firm* — Morgan, Lewis & Bockius LLP (57) ABSTRACT

Apparatus and method for processing speech recognition may include a speech recognition module that recognizes a voice uttered from a user, and a processing module that calls a user DB where information associated with the user is registered when a voice command of the user is input by the speech recognition module, verifies setting information related to a domain corresponding to the voice command, and processes the voice command through a content provider linked to the associated domain.

19 Claims, 10 Drawing Sheets

(56) References Cited

U.S. PATENT DOCUMENTS

| | | | | |
|---|---|---|---|---|
| 6,088,428 | A * | 7/2000 | Trandal | H04M 3/382 |
| | | | | 379/189 |
| 6,681,205 | B1 * | 1/2004 | San Martin | G10L 17/24 |
| | | | | 704/243 |
| 8,620,659 | B2 * | 12/2013 | Di Cristo | G10L 15/22 |
| | | | | 704/257 |
| 9,626,959 | B2 * | 4/2017 | Di Cristo | G06F 40/232 |
| 9,870,770 | B2 * | 1/2018 | Bang | H04R 1/1083 |
| 2011/0131036 | A1 * | 6/2011 | DiCristo | G10L 15/22 |
| | | | | 704/9 |
| 2011/0231182 | A1 * | 9/2011 | Weider | G06F 16/951 |
| | | | | 704/9 |
| 2014/0108013 | A1 * | 4/2014 | Di Cristo | G10L 15/1815 |
| | | | | 704/254 |
| 2016/0133252 | A1 * | 5/2016 | Bang | H04R 1/1083 |
| | | | | 704/233 |
| 2020/0193986 | A1 * | 6/2020 | Joh | G10L 15/22 |

* cited by examiner

[USER_1]

| DOMAIN | MAP | WEATHER | NEWS | ... |
|---|---|---|---|---|
| CONTENT PROVIDER (CP) | A-Map | B-Weather | C-NEWS | ... |

FIG.5A

[USER_2]

| DOMAIN | MAP | WEATHER | NEWS | ... |
|---|---|---|---|---|
| CONTENT PROVIDER (CP) | C-Map | B-Weather | K-NEWS | ... |

FIG.5B

| COMPOUND COMMAND | OPERATION CONTROLS ||||||
|---|---|---|---|---|---|---|
| | AIR CONDITIONER | TEMPERATURE | WINDOW | SUNROOF | SEAT FAN | ... |
| HOT | ON | 18 DEGREE | CLOSING | CLOSING | ON | ... |
| COLD | ON | 27 DEGREE | CLOSING | CLOSING | SEAT HEATING WIRE ON | ... |
| ... | | | | | | |

APPARATUS AND METHOD FOR PROCESSING SPEECH RECOGNITION

CROSS-REFERENCE TO RELATED APPLICATION

The present application claims priority to Korean Patent Application No. 10-2018-0159730, filed on Dec. 12, 2018, the entire contents of which is incorporated herein for all purposes by this reference.

BACKGROUND OF THE INVENTION

Field of the Invention

The present invention relates to apparatus and method for processing speech recognition

Description of Related Art

In general, a speech recognition system processes speech recognition based on the same context for all domains and provides the result to a user.

Thus, it is difficult for the user to distinguish between a domain supporting the speech recognition and a domain not supporting the speech recognition. When the domain does not support the speech recognition, the speech recognition is not processed, lowering convenience of the user.

Furthermore, when two users are uttered simultaneously, the conventional speech recognition system does not process commands due to poor speech recognition performance, or processes only one voice command, lowering the user's convenience.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing apparatus and method for processing speech recognition in which a user DB is configured for each user, information such as a domain, a content provider, and a compound command is registered in the user DB for each user, and speech recognition processing is conducted based on the user DB so that different speech recognition function is provided for each user, increasing the user's convenience.

Furthermore, various aspects of the present invention provide apparatus and method for processing speech recognition which provides different functions by distinguishing between a driver and a passenger, simultaneously processes the speech recognition function by executing a plurality of processing engines, and processes a domain not supported as an exception, increasing user's convenience and satisfaction of the speech recognition function.

The technical problems to be solved by the present inventive concept are not limited to the aforementioned problems, and any other technical problems not mentioned herein will be clearly understood from the following description by those skilled in the art to which the present invention pertains.

According to various aspects of the present invention, an apparatus configured for processing speech recognition including a speech recognition module that recognizes a voice uttered from a user, and a processing module that calls a user DB where information associated with the user is registered when a voice command of the user is input by the speech recognition module, verifies setting information related to a domain corresponding to the voice command, and processes the voice command through a content provider linked to the associated domain.

The user DB stores pieces of domain information and link information related to the content provider set by the user for each domain.

The processing module processes the voice command through the content provider of the domain which is verified by the voice command of the user when the content provider of the domain verified by the voice command of the user does not match link information related to the content provider registered in the user DB.

The processing module updates the information registered in the user DB when the content provider of the domain verified by the voice command of the user does not match the link information related to the content provider registered in the user DB.

The user DB stores a compound command in which pieces of operation control information corresponding to one command is defined.

The processing module verifies and processes the pieces of operation control information corresponding to the compound command from the user DB when the voice command of the user is associated with the compound command registered in the user DB.

The processing module processes the voice command of the user as an exception through means specified in advance and informs a status of the exception processing to the user, when the domain verified by the command of the user does not support a speech recognition process.

The processing module verifies whether the user recognized by the speech recognition module is a driver or a passenger.

The processing module restricts voice command processing function for some domains when the user recognized by the speech recognition module is the passenger.

The processing module calls the user DB where the associated information related to the user is registered to verify mobile terminal information associated with the user and to determine whether information related to the connected mobile terminal matches with information related to the mobile terminal registered in the user DB when the user recognized by the speech recognition module is the passenger.

The processing module restricts voice command processing function for some domains when the information related to the mobile terminal registered in the user DB does not match the information related to the connected mobile terminal.

The processing module executes a plurality of processing engines when voice commands are input from a plurality of users and processes the voice command of each user through the plurality of processing engines.

The processing engine may include an engine based on Natural Language Understanding (NLU) technology.

According to various aspects of the present invention, a method of processing speech recognition including recognizing a voice uttered from a user, calling a user DB where information related to the associated user is registered to verify setting information related to a domain associated with a voice command by when the voice command of the recognized user is input, and processing the voice command through a content provider linked to the associated domain.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In describing the components of the exemplary embodiment according to an exemplary embodiment of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
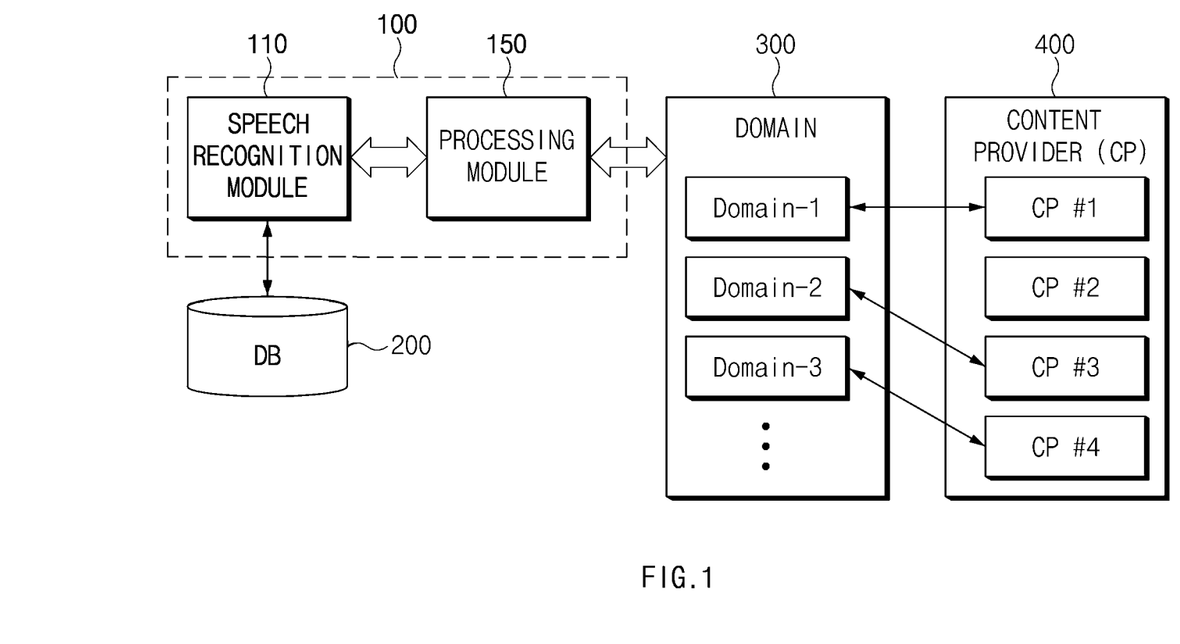
FIG. 1 is a view exemplarily illustrating a configuration of a speech recognition system according to an exemplary embodiment of the present invention.

FIG. 1 is a view exemplarily illustrating a system to which a speech recognition processing device according to an exemplary embodiment of the present invention is applied.

Referring to FIG. 1, the system may include a speech recognition processing device 100, a DB 200, and a plurality of content providers 400 providing contents for each domain 300.

The speech recognition processing device 100 may include a speech recognition module 110 for recognizing a voice command from a voice input by a user and a processing module 150 for processing the voice command recognized by the speech recognition module 110.

The speech recognition module 110 may include a speech recognition engine. The speech recognition module 110 may drive the speech recognition engine and may recognize the voice uttered by the user through the speech recognition engine when the speech recognition function is executed. The speech recognition module 110 may transmit a speech recognition result to the processing module 150.

Figure 2:
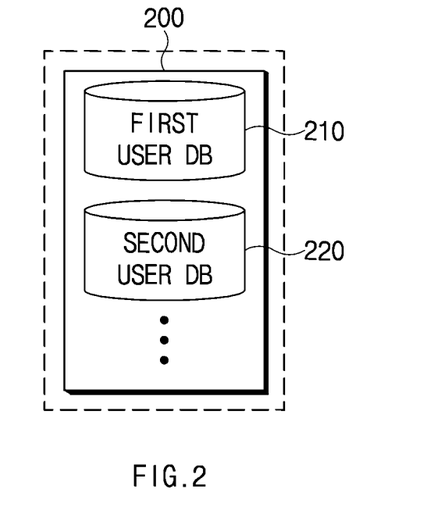
FIG. 2 is a view exemplarily illustrating a configuration of a DB according to an exemplary embodiment of the present invention.

The processing module 150 may register user information in the DB 200 based on the speech recognition result input from the speech recognition module 110. In the instant case, the processing module 150 may configure a user DB for each user and may register the user information in the corresponding user DB. For example, the processing module 150, as illustrated in FIG. 2, may configure a first user DB 210 corresponding to a first user to register first user information in the first user DB 210 and may configure a second user DB 220 corresponding to a second user to register second user information in the second user DB 220.

The processing module 150 may output query contents through a speaker or a display screen when the user information is registered for the first time. The processing module 150 may recognize the user based on the input voice and may register the recognition result in the user DB when a user response for the query contents is input. In the instant case, the processing module 150 may output various types of query contents, such as querying a domain of interest 300 or requesting generic text utterance.

In the instant case, the processing module 150 may process the voice command based on the information registered in the associated user DB when the voice command is input from the user. Furthermore, the processing module 150 may update the speech recognition result to the user DB when the registered user DB already exists.

Here, the processing module 150 may store link information related to the content provider 400 designated by the user for each domain 300 when the user information is registered in the user DB. An exemplary embodiment thereof will be described with reference to FIG. 5A and FIG. 5B. Furthermore, the processing module 150 may store pieces of vehicle control information corresponding to the command selected by the user as a compound command of the user. An exemplary embodiment thereof will be described with reference to FIG. 6.

Furthermore, the processing module 150 recognizes the voice command uttered by the user and processes the recognized voice command.

In the instant case, the processing module 150 may determine whether a talker of the voice input from the speech recognition module 110 is a driver or a passenger who rides together and may provide different speech recognition processing functions for the driver and the passenger.

For example, the processing module 150 may process the voice command for the entire domains 300 with regard to the driver, but may process the voice command for the restricted domain 300 with regard to the passenger.

The processing module 150 may call the domain information for the voice command from the user DB of the associated user who is registered in advance when the voice command is input from the driver or the passenger, and may transmit and process the voice command to the content provider 400 linked to the associated domain 300.

The processing module 150 may execute the processing engine when the voice command is input and may process the voice command through the executed processing engine. In the instant case, the processing module 150 may operate a plurality of processing engines when the driver and the passenger simultaneously are uttered and may simultaneously process voice commands of a plurality of users through each processing engine. Here, the processing engine may be an engine based on Natural Language Understanding (NLU) technology.

Meanwhile, when the processing module 150 does not support the domain 300 which corresponds to the voice command input from the user, the processing module 150 may be exceptionally process the voice command through a specific means such as a web search and may provide a response of the exception processing to the user.

The speech recognition processing device 100 according to an exemplary embodiment of the present invention may be implemented inside a vehicle. Here, the speech recognition processing device 100 may be integrally formed with internal controllers of the vehicle. Alternatively, the speech recognition processing device 100 may be implemented as an additional device and may be connected to the controllers of the vehicle through an additional connector.

Furthermore, the speech recognition processing device 100 according to the exemplary embodiment may be implemented as an independent hardware device. The speech recognition processing device 100 may be at least one processor and may be driven in a form included in another hardware device such as a microprocessor or a general purpose computer system.

The domain 300 may classify for functions requested by the user. For example, the domain 300 may be classified into a map, weather, news, and the like.

The content provider 400 may provide contents associated with each domain 300. For example, the content provider 400 may provide map contents associated with a map domain 300. Furthermore, the content provider 400 may provide whether contents linked to the meteorological administration associated with a weather domain 300. Here, a content associated with one domain 300 providing one content may be provided and a content associated with a plurality of domains 300 may be provided.

Hereinafter, operation flow of the speech recognition processing device according to an exemplary embodiment of the present invention will be described in more detail as follows.

Figure 3:
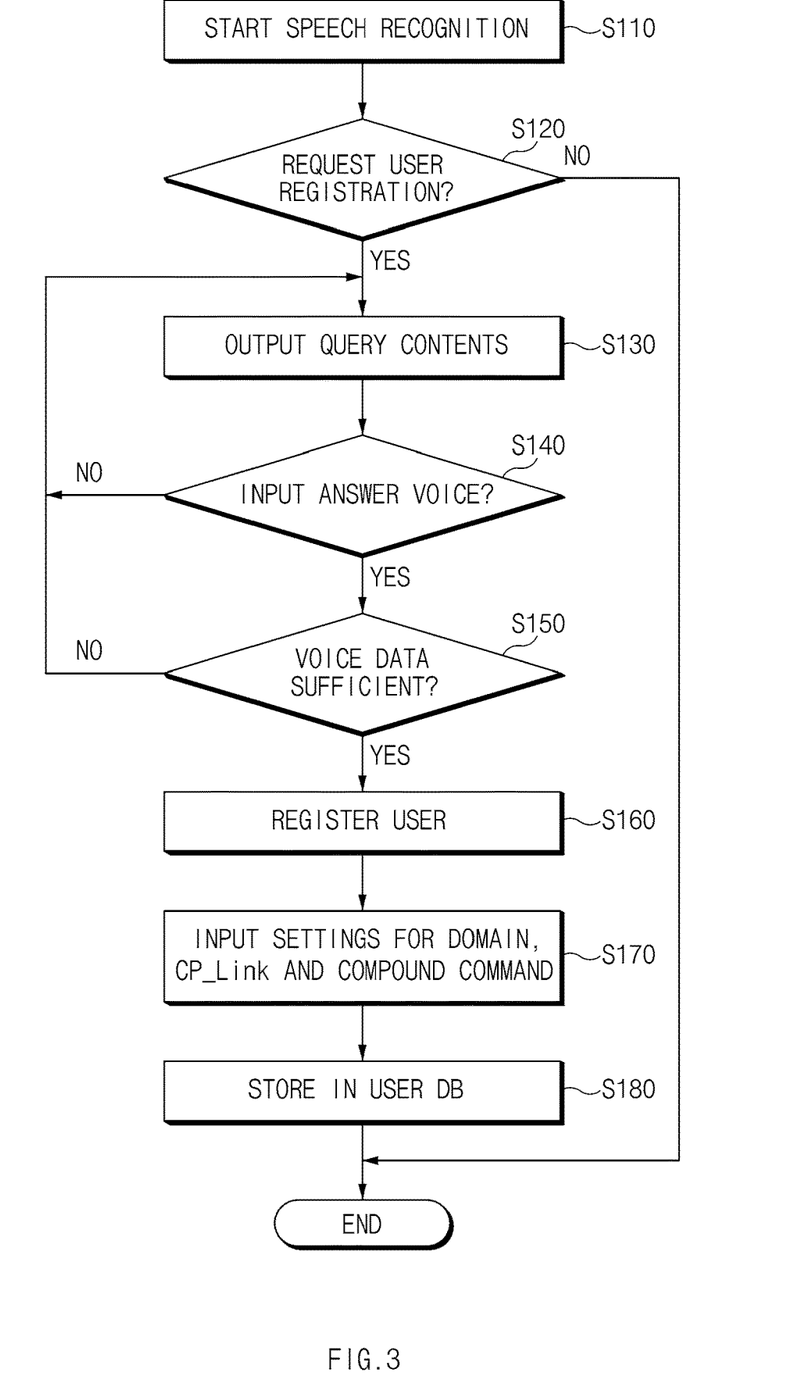
FIG. 3 is a flowchart illustrating a method of registering a user of a speech recognition processing device according to an exemplary embodiment of the present invention.

FIG. 3 is a flowchart illustrating a method of registering the user of the speech recognition processing device according to an exemplary embodiment of the present invention. Here, the speech recognition processing device 100 may perform the user registration for the driver through operations of FIG. 3.

Referring to FIG. 3, the speech recognition processing device 100 starts a speech recognition function in S110. When requesting the user registration in S120, the speech recognition processing device 100 outputs query contents for voice registration of the user in S130. Here, the speech recognition processing device 100 may output the query contents in a form of voice type through a speaker or in a text form through a display.

The primary query content may include a content querying a user's domain of interest.

The speech recognition processing device 100 may output the query contents again in S130 when an answer voice is not input from the user within a specific time in S140.

The speech recognition processing device 100 determines whether the answer voice input from the user is sufficient as voice data for the voice recognition when the voice with regard to the query contents is input. The speech recognition processing device 100 may secondarily output a query content when the answer voice is not sufficient as the voice data in S150. Here, the secondary query content may be a simple text utterance request.

Therefore, an exemplary embodiment for outputting the query contents will be described with reference to FIG. 4.

Figure 4:
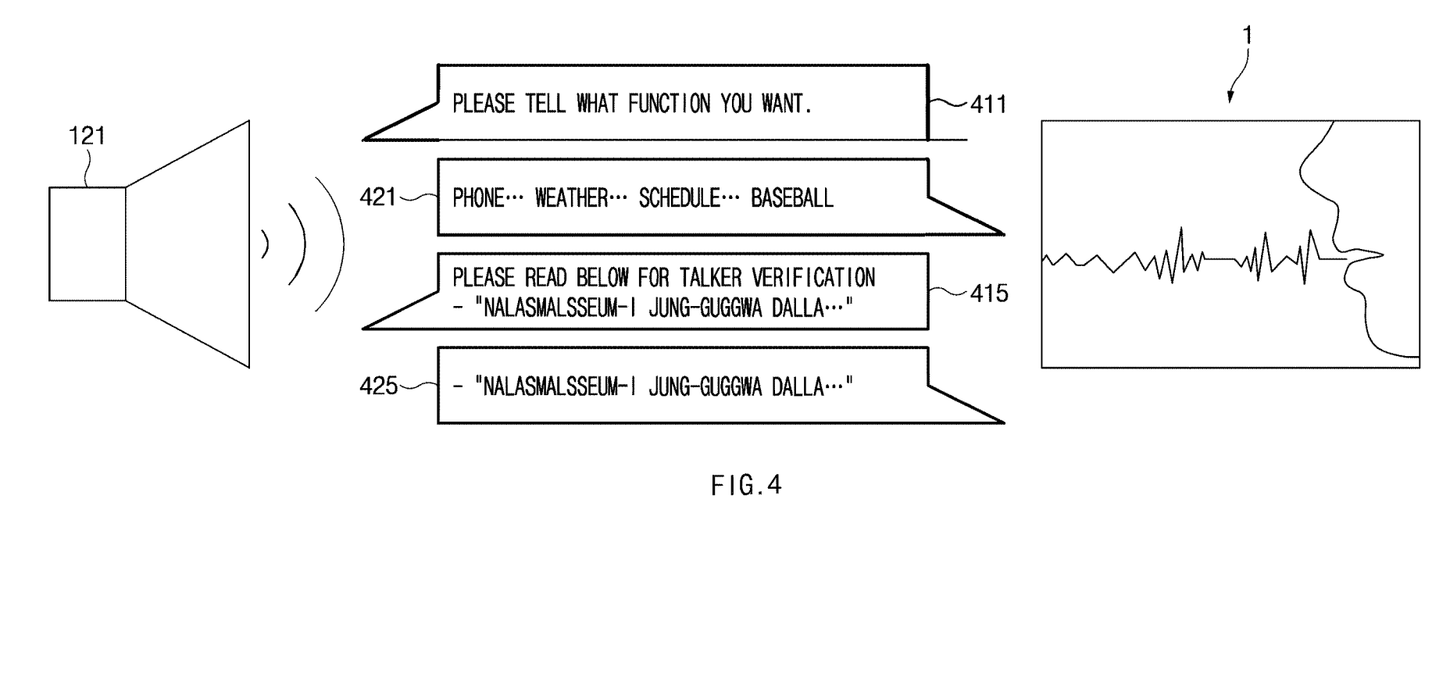
FIG. 4, FIG. 5A, FIG. 5B, and FIG. 6 are views illustrating an exemplary embodiment which is referenced to illustrate operations for a method of registering a user according to an exemplary embodiment of the present invention.

The exemplary embodiment of FIG. 4 shows an exemplary embodiment in which the primary and secondary query contents are output in the voice form through a speaker. Referring to FIG. 4, the speech recognition processing device 100 outputs primary query content 411 querying the domain of interest through a speaker 121. Here, the speech recognition processing device 100 performs the voice recognition based on an answer voice 421 primarily input from a user 1.

The speech recognition processing device 100 outputs secondary query content 415 for requesting the simple text utterance through the speaker 121 when the answer voice primarily input is not to perform the voice recognition. Here, the speech recognition processing device 100 performs the voice recognition based on the answer voice 425 input secondarily from the user 1.

When securing voice data of the user in S150, the speech recognition processing device 100 registers the user information based on the voice data of the user in S160.

Here, the speech recognition processing device 100 may store setting information additionally input from the user, for example, the domain of interest, the link information CP_Link of the content provider 400 corresponding to the domain of interest, the compound command, and the like in the user DB in S170 and S180.

Figure 5A:
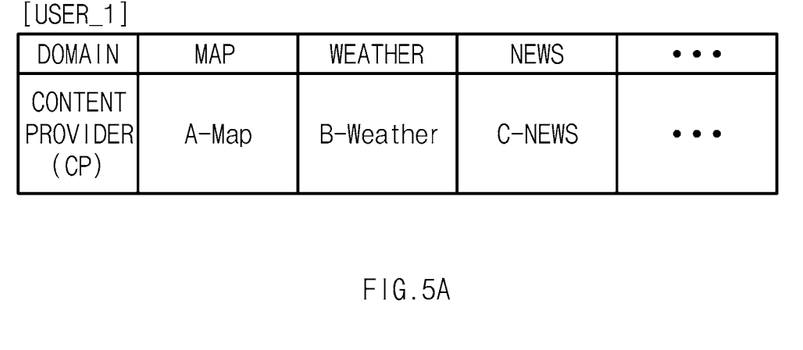

In the instant case, the link information CP_Link of the content provider 400 corresponding to the domain of interest will be illustrated as FIG. 5A. The speech recognition processing device 100 may store a link of an A-Map for the map domain, a link of a B-weather for the whether domain, and a link of C_News for the news domain with regard to a first user USER_1.

The link information CP_Link of the content provider 400 corresponding to the domain of interest may be set differently for each user.

Figure 5B:
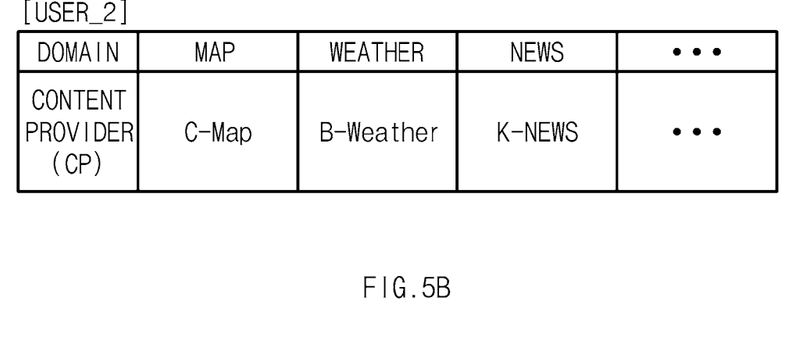

FIG. 5B shows the link information CP_Link of the content provider 400 corresponding to the domain of interest of the second user. As illustrated in FIG. 5B, the speech recognition processing device 100 may store a link of C-Map for the map domain, a link of B-Weather for the weather domain, and a link of K_NEWS for the news domain with regard to the second user USER_2. The content provider 400 corresponding to the domain may be arbitrarily designated by each user.

Figure 6:
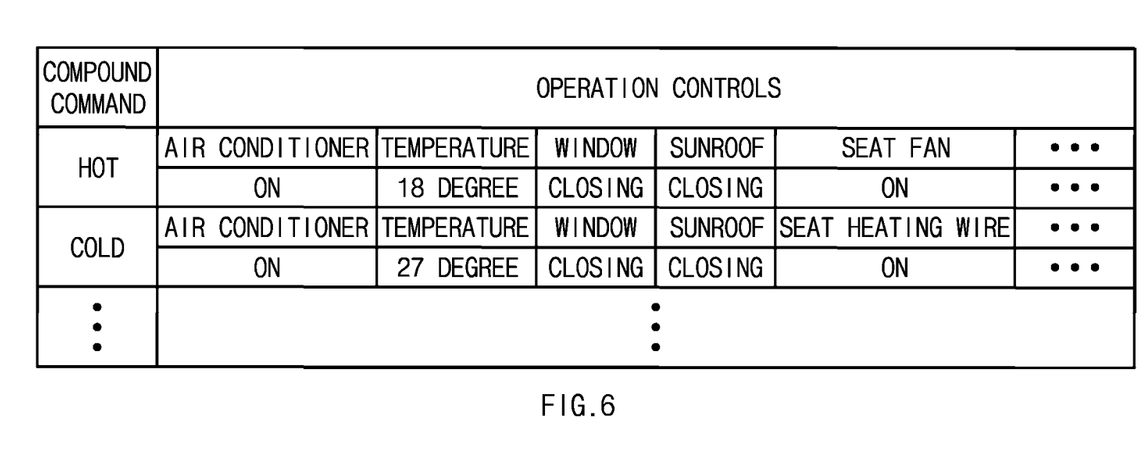

Furthermore, an exemplary embodiment for the compound command will be described with reference to FIG. 6. Referring to FIG. 6, the user may select a plurality of operation controls for one compound command and the speech recognition processing device 100 may define the plurality of operation controls selected by the user for one compound command.

For example, the speech recognition processing device 100 may perform the plurality of operation controls such as an air conditioner—ON, a temperature—18 degree, a window—closing, a sun roof—closing, a seat fan—ON, and the like with regard to the compound command associated with "it is hot" as with reference numeral 611. Alternatively, the speech recognition processing device 100 may perform the plurality of operation controls such as the air conditioner—ON, the temperature—27 degree, the window—closing, the sun roof—closing, a seat heating wire—ON, and the like with regard to the compound command associated with "it is cold" as with reference numeral 612.

Figure 7:
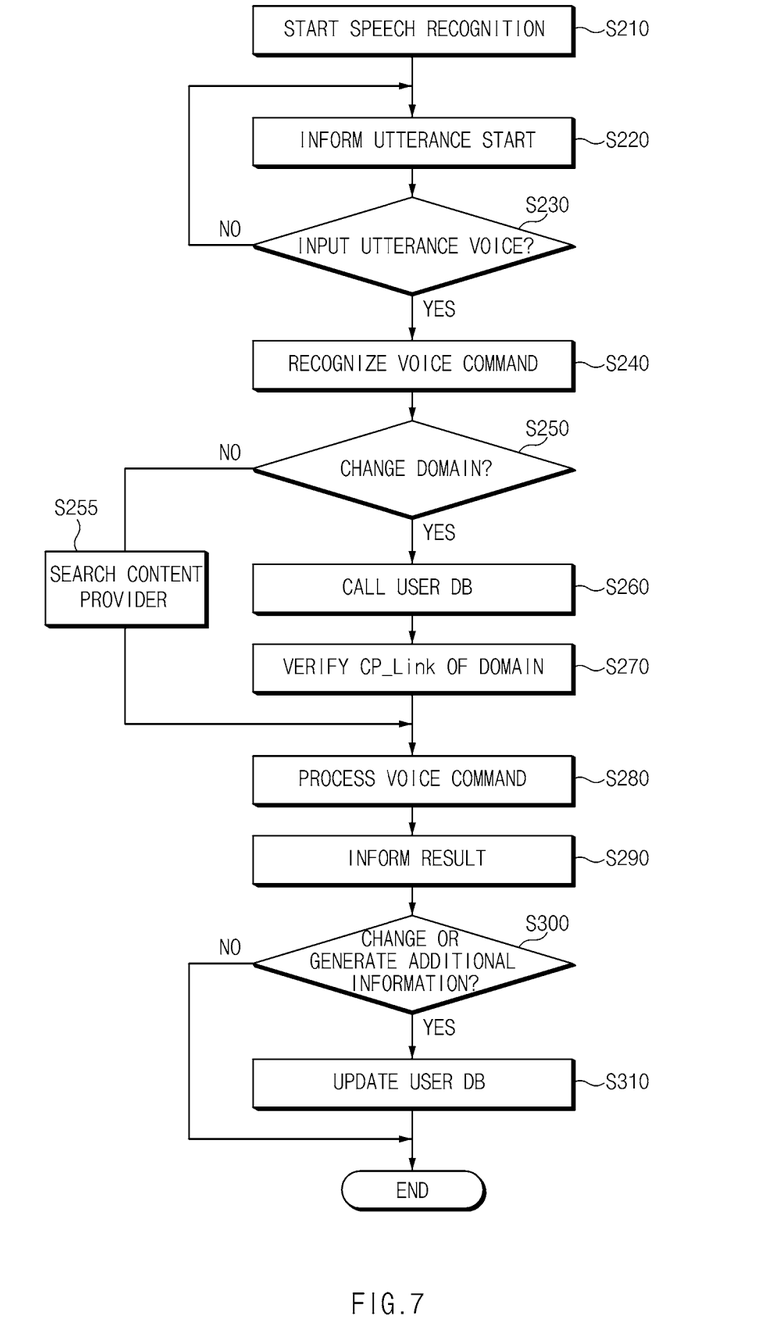
FIG. 7 is a flowchart illustrating a method of processing speech recognition of a speech recognition processing device according to various exemplary embodiments of the present invention.

FIG. 7 is a flowchart illustrating a method of processing speech recognition of the speech recognition processing device according to various exemplary embodiments of the present invention. FIG. 7 shows an operation in which the speech recognition processing device 100 processes the voice command of the driver.

Referring FIG. 7, when the speech recognition function is started in S210, the speech recognition processing device 100 informs the user (the driver) to start utterance in S220.

The speech recognition processing device 100 recognizes the voice command from the utterance voice of the user when the utterance voice is input from the user in S240.

In the instant case, the speech recognition device calls the user DB in S260 and verifies the link information CP_Link of the content provider 400, which is set in the domain associated with the voice command from the user DB called in operation S260, in S270.

In S280, the speech recognition processing device 100 processes the voice command through the content provider 400 using the link information CP_Link verified in S270.

Meanwhile, when the voice command recognized in S240 changes the previously registered domain information in S250, the speech recognition processing device 100 may search for the requested content provider in S255 and may process the voice command in S280 through the content provider 400 searched in S255.

The speech recognition processing device 100 informs the voice command processing result to the user in S290. Here, when the information previously registered in the user DB is changed or additional information is generated in S300 upon processing the voice command, the speech recognition processing device 100 updates the associated information in the user DB in S310.

Figure 8A:
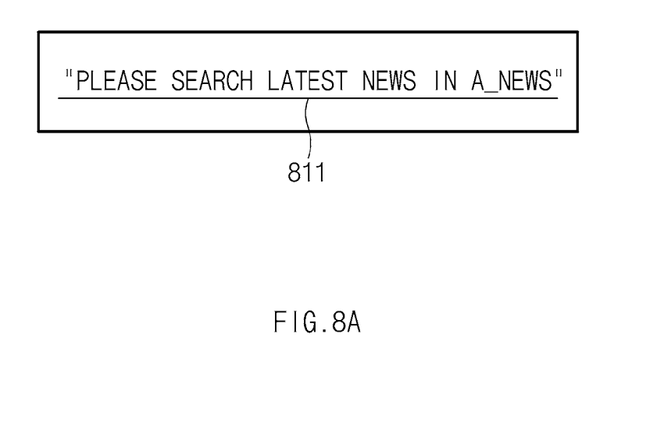
FIG. 8A and FIG. 8B are views illustrating an exemplary embodiment which is referenced to illustrate operations for the method of processing speech recognition according to the various exemplary embodiments of the present invention.
Figure 8B:
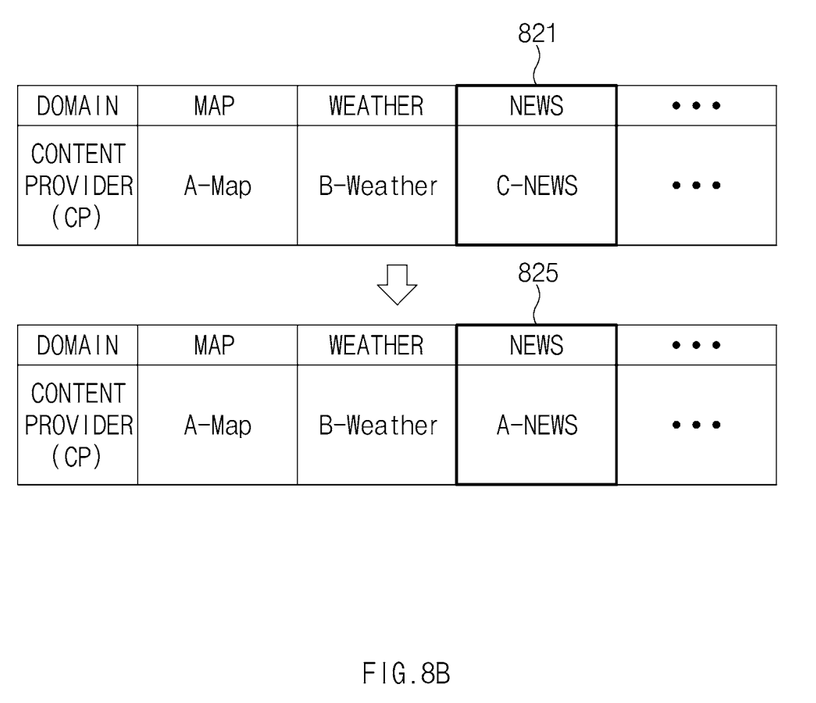

For example, as illustrated in FIG. 8A, when a voice command 811 such as "search the latest news in A_NEWS" from the user is processed, as illustrated in FIG. 8B, the speech recognition processing device 100 updates the information related to the news domain registered in the user DB.

Namely, as shown in reference numeral 821, when the link information related to the C_NEWS for the news domain is stored in the previous user DB, the link information related to the C_NEWS may be updated to the link information related to the A_NEWS as indicated by reference numeral 825.

Figure 9:
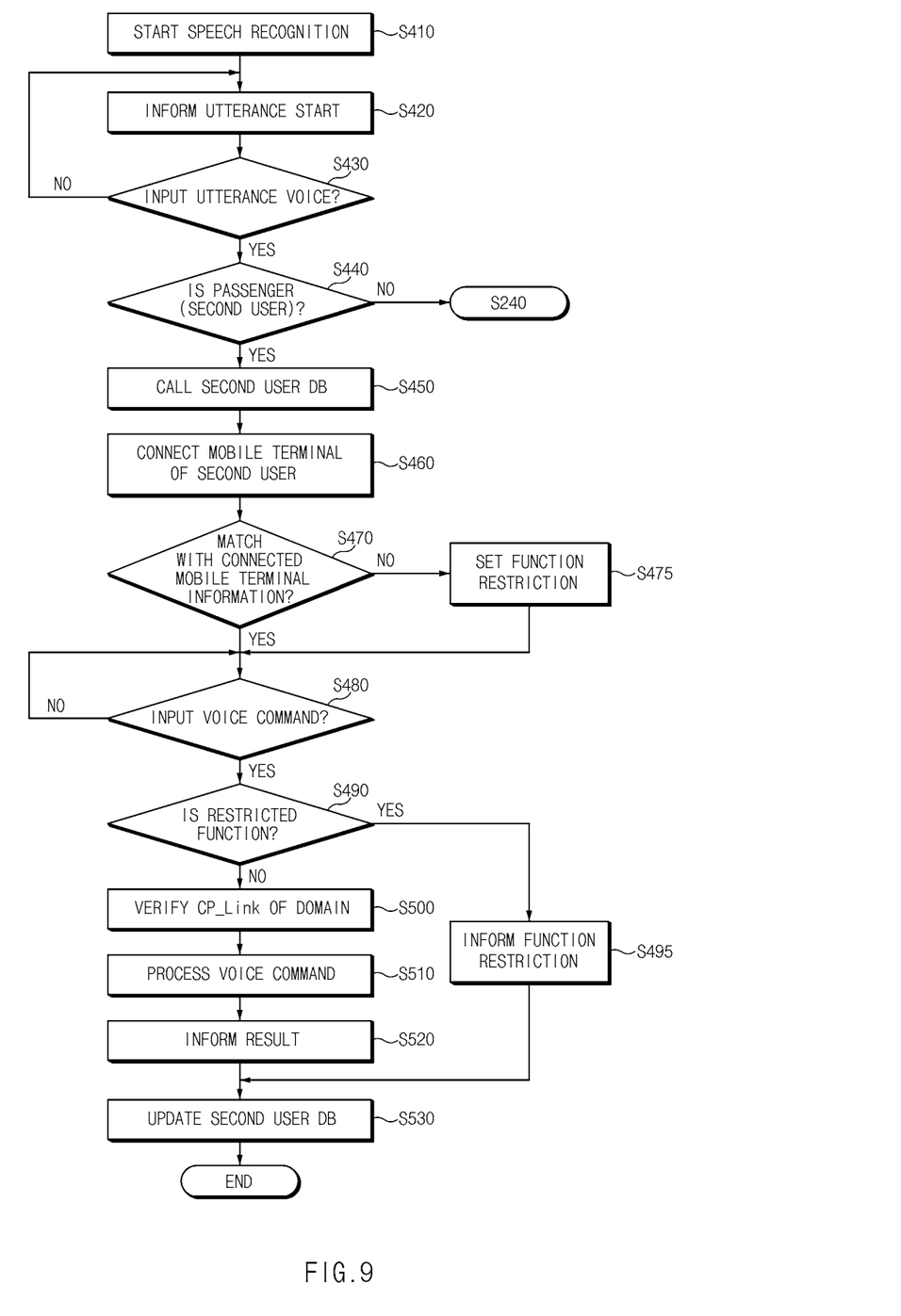
FIG. 9 is a flowchart illustrating a method of processing speech recognition of a speech recognition processing device according to various exemplary embodiments of the present invention.

FIG. 9 is a flowchart illustrating a method of processing speech recognition of the speech recognition processing device according to various exemplary embodiments of the present invention. FIG. 9 shows that the speech recognition processing device 100 processes the voice command of the passenger.

Referring to FIG. 9, when the speech recognition function is started in S410, the speech recognition processing device 100 informs the user to start utterance in S420.

The speech recognition processing device 100 verifies whether the user who utters is the passenger (the second user) when the utterance voice is input from the user in S440. In S150, the speech recognition processing device 100 calls the second user DB when it is confirmed that the user who utters is the passenger (the second user).

In the instant case, the speech recognition processing device 100 is connected to a mobile terminal of the second user in S460 and verifies whether a mobile terminal registered in the second user DB matches with the information related to the mobile terminal connected thereto in S470. The speech recognition processing device 100 may set a limit for some functions among functions provided to the passenger when the information related to the mobile terminal connected to the speech recognition processing device 100 in operation S470 is different from the mobile terminal registered in the second user DB S475.

For example, the speech recognition processing device 100 may restrict a dialing function, a vehicle control function, a destination search function, or the like.

When the voice command is input from the second user in S480, the speech recognition processing device 100 verifies whether the voice command input in S480 is the restricted function with regard to the user or the passenger S490.

When it is confirmed that the input voice command is the restricted function with regard to the user or the passenger, in S495, the speech recognition processing device 100 may inform the function restriction to the associated user. For example, the speech recognition processing device 100 may output a notified message such as "it is a service offered only to the driver" or "it is a service offered only to the authenticated user".

Meanwhile, the speech recognition processing device 100 verifies the link information related to the content provider 400 CP_Link set in the domain associated with the voice command from the second user DB in S500 when the voice command input from the second user is not the restricted function.

The speech recognition processing device 100 processes the voice command in S510 through the content provider 400 using the link information CP_Link verified in S500, and the speech recognition processing device 100 informs the voice command processing result to the second user in S520. Here, when the previous information registered in the second user DB is changed or the additional information occurs during processing the voice command of the second user, the speech recognition processing device 100 updates the associated information in the second user DB in S530.

Figure 10:
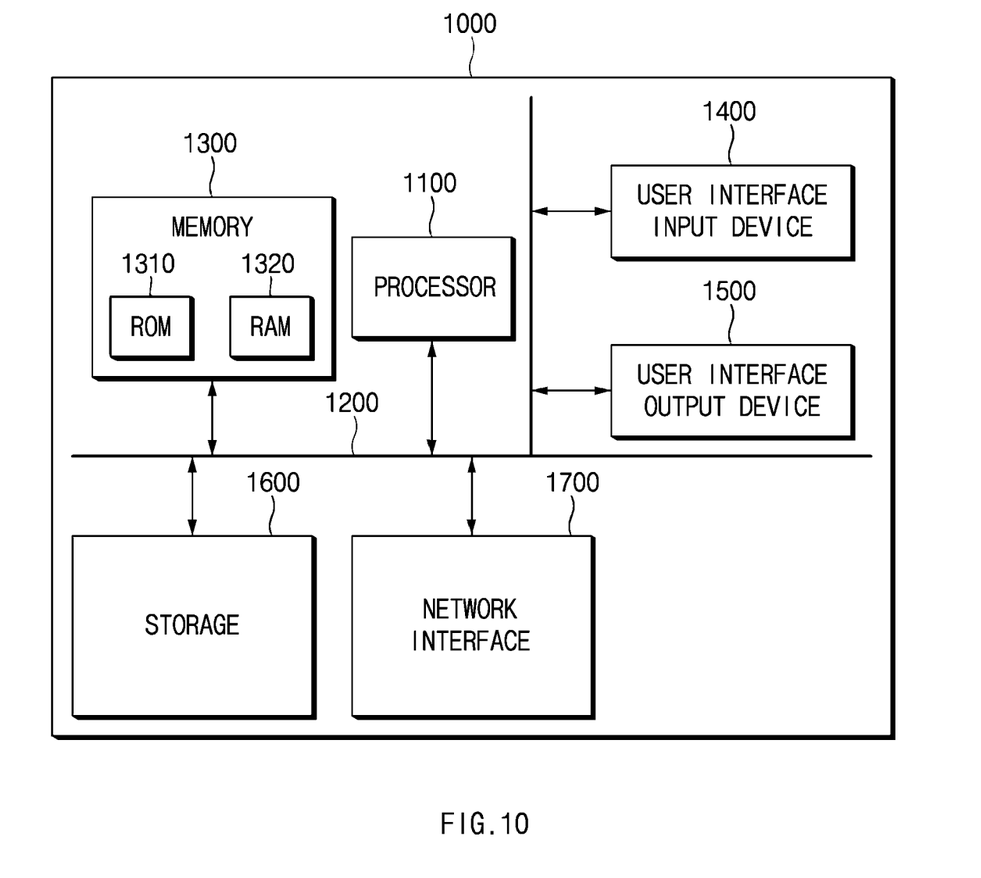
FIG. 10 is a view exemplarily illustrating a determining system conducting a method according to an exemplary embodiment of the present invention.

FIG. 10 is a view exemplarily illustrating a computing system conducting a method according to an exemplary embodiment of the present invention.

Referring to FIG. 10, a computing system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to an exemplary embodiment of the present invention, the user DB is configured for each user, the information such as the domain, the content provider, and the compound command is registered in the user DB for each user, and the speech recognition processing is conducted based on the user DB so that different speech recognition functions are provided for each user, increasing the user's convenience.

Furthermore, according to an exemplary embodiment of the present invention, the different functions by distinguishing between the driver and the passenger are provided, the speech recognition function is simultaneously processed by executing the plurality of processing engines, and the domain not supported is processed as the exception, increasing user's convenience and satisfaction of the speech recognition function.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus for processing speech recognition, the apparatus comprising:
   a speech recognition module configured to recognize a voice uttered from a user; and
   a processing module configured to:
      call a user DB where information associated with the user is registered in a response that a voice command of the user is input by the speech recognition module;
      verify setting information related to a domain corresponding to the voice command; and
      process the voice command through a content provider linked to an associated domain,
      wherein the processing module processes the voice command through the content provider of the domain which is verified by the voice command of the user in the response that the content provider of the domain verified by the voice command of the user does not match link information related to the content provider registered in the user DB.

2. The apparatus of claim 1, wherein the user DB stores pieces of domain information and link information related to the content provider set by the user for each domain.

3. The apparatus of claim 1, wherein the processing module updates the link information registered in the user DB in the response that the content provider of the domain verified by the voice command of the user does not match the link information related to the content provider registered in the user DB.

4. The apparatus of claim 1, wherein the user DB stores a compound command in which pieces of operation control information corresponding to one command is defined.

5. The apparatus of claim 4, wherein the processing module verifies and processes the pieces of operation control information corresponding to the compound command from the user DB in a response that the voice command of the user is associated with the compound command registered in the user DB.

6. The apparatus of claim 1, wherein the processing module is configured to process the voice command of the user as an exception through means specified in advance and inform a status of the exception processing to the user in a response that the domain verified by the voice command of the user does not support a speech recognition process.

7. The apparatus of claim 1, wherein the processing module verifies whether the user recognized by the speech recognition module is a driver or a passenger.

8. The apparatus of claim 7, wherein the processing module restricts voice command processing function for predetermined domains in a response that the user recognized by the speech recognition module is the passenger.

9. The apparatus of claim 7, wherein the processing module calls the user DB where the associated information related to the user is registered to verify mobile terminal information associated with the user and to determine whether information related to a connected mobile terminal matches with information related to a mobile terminal registered in the user DB in a response that the user recognized by the speech recognition module is the passenger.

10. The apparatus of claim 9, wherein the processing module restricts voice command processing function for predetermined domains in a response that the information related to the mobile terminal registered in the user DB does not match the information related to the connected mobile terminal.

11. The apparatus of claim 1, wherein the processing module executes a plurality of processing engines in a response that voice commands are input from a plurality of users and processes the voice command of each user through the plurality of processing engines.

12. The apparatus of claim 11, wherein each processing engine includes an engine based on Natural Language Understanding (NLU) technology.

13. A method of processing speech recognition, the method comprising:
recognizing a voice uttered from a user;
calling a user DB where information related to an associated user is registered to verify setting information related to a domain associated with a voice command by when the voice command of a recognized user is input;
processing the voice command through a content provider linked to the associated domain; and
processing the voice command through the content provider of the domain which is verified by the voice command of the user in a response that the content provider of the domain verified by the voice command of the user does not match link information related to the content provider registered in the user DB.

14. The method of claim 13, wherein the user DB stores pieces of domain information and link information related to the content provider set by the user for each domain.

15. The method of claim 13, further comprising:
updating information registered in the user DB in the response that the content provider of the domain verified by the voice command of the user does not match the link information related to the content provider registered in the user DB.

16. The method of processing speech recognition of claim 13, wherein the user DB stores a compound command in which pieces of operation control information corresponding to one command is defined.

17. The method of claim 16, further comprising:
verifying and processing the pieces of operation control information corresponding to the compound command from the user DB in a response that the voice command of the user is associated with the compound command registered in the user DB.

18. The method of claim 13, further comprising:
verifying whether the recognized user is a driver or a passenger; and
restricting voice command processing function for predetermined domains when the recognized user is the passenger.

19. The method of claim 18, further comprising:
calling the user DB where associated information related to the user is registered to verify mobile terminal information associated with the user and to determine whether the associated information related to the user matches with mobile terminal information related to the associated user in a response that the recognized user is the passenger; and
restricting the voice command processing function for predetermined domains in a response that the information related to a mobile terminal registered in the user DB does not match information related to a connected mobile terminal.

* * * * *